United States Patent
Chen et al.

(10) Patent No.: US 9,967,363 B2
(45) Date of Patent: *May 8, 2018

(54) ACTIVITY ANALYSIS FOR MONITORING AND UPDATING A PERSONAL PROFILE

(71) Applicant: International Business Machines Corporation, Armonk, NY (US)

(72) Inventors: Feng-wei Chen, Cary, NC (US); Joseph D. Johnson, Raleigh, NC (US); Yongcheng Li, Cary, NC (US); Samuel R. McHan, Jr., Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/495,711

(22) Filed: Sep. 24, 2014

(65) Prior Publication Data

US 2015/0032821 A1 Jan. 29, 2015

Related U.S. Application Data (63) Continuation of application No. 13/949,997, filed on Jul. 24, 2013.

(51) Int. Cl.
*H04L 29/08* (2006.01)
*G06Q 10/06* (2012.01)

(52) U.S. Cl.
CPC ............ *H04L 67/306* (2013.01); *H04L 67/22* (2013.01); *G06Q 10/063112* (2013.01)

(58) Field of Classification Search
CPC ............ G06Q 10/063; G06Q 10/0639; G06Q 10/063114; G06Q 10/06398; G06Q 10/063118; G06Q 10/06311; G06Q 10/06313; G06Q 10/0633; G06Q 10/063112

See application file for complete search history.

(56) References Cited

U.S. PATENT DOCUMENTS

| | | |
|---|---|---|
| 7,243,105 B2 | 7/2007 | Thint et al. |
| 7,263,529 B2 | 8/2007 | Cordery et al. |
| 7,519,539 B1* | 4/2009 | Fliess ............... G06Q 10/00 705/301 |
| 7,930,255 B2 | 4/2011 | Choi et al. |
| 9,654,592 B2* | 5/2017 | Jayaram ............... H04L 67/306 |

(Continued)

OTHER PUBLICATIONS

Change text color for skill proficiency—Google Search, Jun. 2, 2017.*

(Continued)

*Primary Examiner* — Patrice L Winder
*Assistant Examiner* — Ruth Solomon
(74) *Attorney, Agent, or Firm* — Janaki K. Davda; Konrad, Raynes, Davda & Victor LLP (57) ABSTRACT

Provided are techniques for activity analysis for monitoring and updating a personal profile. User activities are monitored to create a user activity log. The user activity log and a user profile are analyzed using one or more profile entity to activity mappings to identify one or more suggestions for updating the user profile. The one or more suggestions are provided to update the user profile. In response to acceptance of at least one of the suggestions, the user profile is updated.

5 Claims, 7 Drawing Sheets

(56) References Cited

U.S. PATENT DOCUMENTS

| | | | | |
|---|---|---|---|---|
| 2003/0182178 | A1* | 9/2003 | D'Elena | G06Q 10/063112 705/7.14 |
| 2004/0002887 | A1* | 1/2004 | Fliess | G06Q 10/063112 705/7.14 |
| 2005/0165797 | A1 | 7/2005 | Nair | |
| 2007/0203791 | A1 | 8/2007 | Kohl et al. | |
| 2009/0083221 | A1* | 3/2009 | Pingali | G06Q 10/06398 |
| 2009/0164926 | A1 | 6/2009 | Boyle et al. | |
| 2009/0292590 | A1 | 11/2009 | Zaidi | |
| 2009/0292594 | A1 | 11/2009 | Zaidi | |
| 2010/0138370 | A1* | 6/2010 | Wu | G06F 17/30702 706/12 |
| 2010/0169134 | A1 | 7/2010 | Cheng et al. | |
| 2010/0281059 | A1* | 11/2010 | Lynch | G06Q 30/02 707/784 |
| 2010/0319053 | A1 | 12/2010 | Gharabally | |
| 2011/0010415 | A1 | 1/2011 | Kodama | |
| 2011/0066497 | A1* | 3/2011 | Gopinath | G06Q 30/02 705/14.53 |
| 2011/0106584 | A1 | 5/2011 | Borthwick et al. | |
| 2012/0035986 | A1* | 2/2012 | Jimenez | G06Q 10/06398 705/7.42 |
| 2012/0095862 | A1 | 4/2012 | Schiff et al. | |
| 2012/0215580 | A1 | 8/2012 | Barney et al. | |
| 2013/0024465 | A1 | 1/2013 | Schiff et al. | |
| 2013/0074180 | A1* | 3/2013 | Chim | G06F 21/33 726/18 |
| 2014/0074560 | A1* | 3/2014 | B'Far | G06Q 50/01 705/7.38 |
| 2014/0129573 | A1* | 5/2014 | deWaal | H04L 51/32 707/751 |
| 2014/0136933 | A1* | 5/2014 | Berger | G06Q 10/10 715/202 |
| 2014/0278633 | A1* | 9/2014 | Daly | G06Q 10/063112 705/7.14 |
| 2014/0278821 | A1* | 9/2014 | McConnell | G06Q 10/0639 705/7.38 |
| 2014/0282098 | A1* | 9/2014 | McConnell | G06Q 10/0639 715/753 |
| 2014/0310037 | A1* | 10/2014 | Griffin | G06Q 10/0631 705/7.12 |
| 2014/0335501 | A1* | 11/2014 | Bahree | G09B 19/00 434/428 |
| 2014/0358606 | A1* | 12/2014 | Hull | G06Q 10/063112 705/7.14 |

OTHER PUBLICATIONS

Color and skill proficiency—Google Search, Jun. 2, 2017.*
Color and skill proficiency update—Google Search, Jun. 2, 2017.*
Bajaj, A., and S. Ram, "SEAM: A State-Entity-Activity-Model for a Well-Defined Workflow Development Methodology", IEEE Transactions on Knowledge and Data Engineering, vol. 14, Issue 2, Mar/Apr. 2002, pp. 415-431. [Also, Total 17 pp.].
IBM Corp., "Automatic Personal Profile Update for Social Networking Websites", Jun. 11, 2008, downloaded from the Internet at <URL: http://www.ip.com/pubview/IPCOM000171480D>, Total 4 pp.
Kashyap, A., and V. Hristidis, "LogRank: Summarizing Social Activity Logs", Fifteenth International Workshop on the Web and Databases, (WebDB 2012), May 20, 2012, Total 6 pp.
Mell, P. and T. Grance, "Effectively and Securely Using the Cloud Computing Paradigm", NIST, Information Technology Laboratory, Oct. 7, 2009, Total 80 pp.
Mell, P. and T. Grance, "The NIST Definition of Cloud Computing (Draft)", National Institute of Standards and Technology, Jan. 2011, Total 7 pp.
U.S. Appl. No. 13/949,997, filed Jul. 24, 2013, entitled, "Activity Analysis for Monitoring and Updating a Personal Profile", invented by F. Chen et al., Total 31 pp. [57.311 (Appln)].
Preliminary Amendment, dated Sep. 24, 2014, for U.S. Appl. No. 13/949,997, filed Jul. 24, 2013 by F. Chen et al., Total 5 pp. [57.311 (PrelimAmend)].
Office Action 1, dated May 15, 2015, for U.S. Appl. No. 13/949,997, filed Jul. 24, 2013 by F. Chen et al., Total 25 pp. [57.311 (OA1)].
Response to Office Action 1, dated Aug. 18, 2015, for U.S. Appl. No. 13/949,997, filed Jul. 24, 2013 by F. Chen et al., Total 16 pp. [57.311 (ROA1)].
Final Office Action, dated Dec. 2, 2015, for U.S. Appl. No. 13/949,997, filed Jul. 24, 2013 by F. Chen et al., Total 19 pp. [57.311 (FOA)].
Response to Final Office Action, dated Mar. 2, 2016, for U.S. Appl. No. 13/949,997, filed Jul. 24, 2013 by F. Chen et al., Total 16 pp. [57.311 (RFOA)].
Office Action 3, dated Apr. 7, 2016, for U.S. Appl. No. 13/949,997, filed Jul. 24, 2013 by F. Chen et al., Total 28 pp. [57.311 (OA3)].
Response to Office Action 3, dated Jul. 6, 2016, for U.S. Appl. No. 13/949,997, filed Jul. 24, 2013 by F. Chen et al., Total 16 pp. [57.311 (ROA3)].
Final Office Action 2, dated Nov. 14, 2016, for U.S. Appl. No. 13/949,997, filed Jul. 24, 2013 by F. Chen et al., Total 30 pp. [57.311 (FOA2)].
Response to Final Office Action 2, Feb. 14, 2017, for U.S. Appl. No. 13/949,997, filed Jul. 24, 2013 by F. Chen et al., Total 10 pp. [57.311 (RFOA2)].
Office Action 5, dated Jun. 21, 2017, for U.S. Appl. No. 13/949,997, filed Jul. 24, 2013 by F. Chen et al., Total 32 pp. [57.311 (OA5)].
Response to Office Action 5, dated Sep. 21, 2017, for U.S. Appl. No. 13/949,997, filed Jul. 24, 2013 by F. Chen et al., Total 13 pp. [57.311 (ROA5)].
Notice of Allowance, dated Dec. 29, 2017, for U.S. Appl. No. 13/949,997, filed Jul. 24, 2013 by F. Chen et al., Total 14 pp.

* cited by examiner

ACTIVITY ANALYSIS FOR MONITORING AND UPDATING A PERSONAL PROFILE

FIELD

Embodiments of the invention relate to activity analysis for monitoring and updating a personal profile.

BACKGROUND

User profile information provides information about a user, such as the user's skills, interests, etc. The user profile is useful information for social networking and effective communication/collaboration within a business organization. With accurate profile data, it is possible for a user to get connected to the right person for collaboration and help. Typically, a use establishes the user profile, and the user is responsible for updating the user profile. In some systems, a user is reminded to update the user profile manually, but the user may not know which parts of the user profile should be updated or may not remember information that should be added to the user profile.

SUMMARY

Provided is a method for activity analysis for monitoring and updating a personal profile. User activities are monitored to create a user activity log. The user activity log and a user profile are analyzed using one or more profile entity to activity mappings to identify one or more suggestions for updating the user profile. The one or more suggestions are provided to update the user profile. In response to acceptance of at least one of the suggestions, the user profile is updated.

Provided is a computer program product for activity analysis for monitoring and updating a personal profile. The computer program product comprises a computer readable storage medium having program code embodied therewith, the program code executable by at least one processor to perform: monitoring user activities to create a user activity log; analyzing the user activity log and a user profile using one or more profile entity to activity mappings to identify one or more suggestions for updating the user profile; providing the one or more suggestions to update the user profile; and, in response to acceptance of at least one of the suggestions, updating the user profile.

Provided is a computer system for activity analysis for monitoring and updating a personal profile. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: monitoring user activities to create a user activity log; analyzing the user activity log and a user profile using one or more profile entity to activity mappings to identify one or more suggestions for updating the user profile; providing the one or more suggestions to update the user profile; and, in response to acceptance of at least one of the suggestions, updating the user profile.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
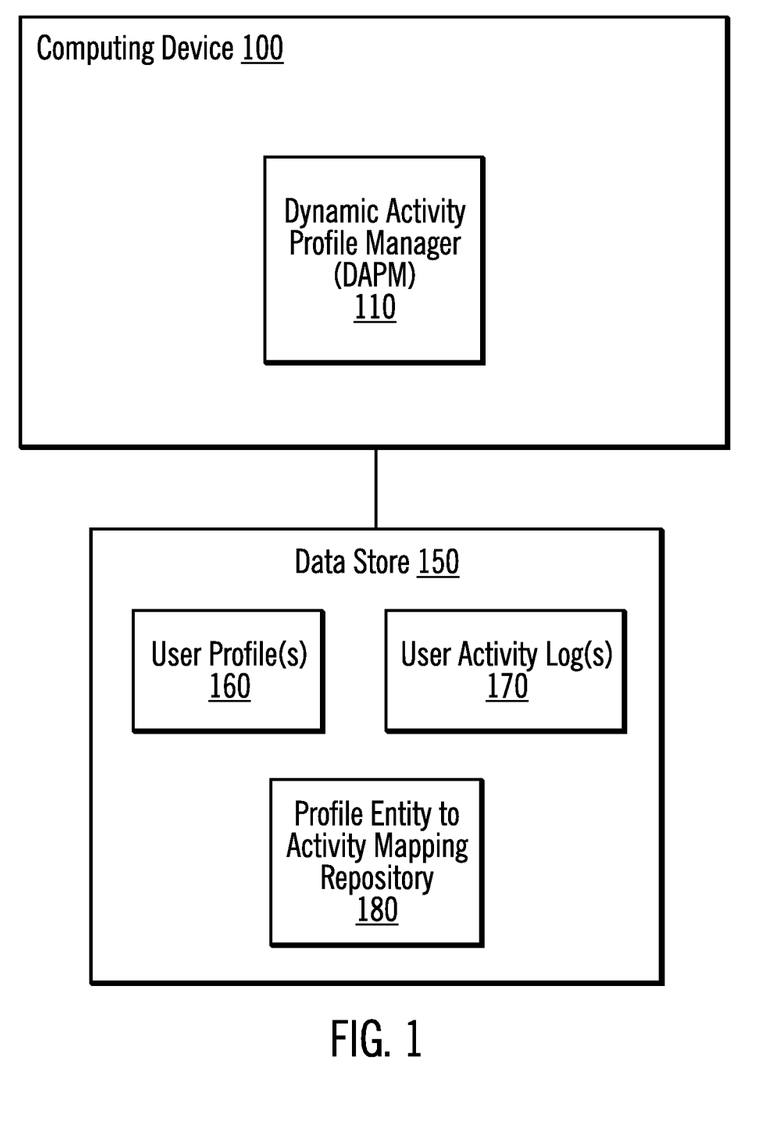
FIG. 1 illustrates, in a block diagram, a computing environment in accordance with certain embodiments.

FIG. 1 illustrates, in a block diagram, a computing environment in accordance with certain embodiments. A computing device 100 includes a Dynamic Activity Profile Manager (DAPM) 110. The computing device 100 is coupled to a data store 150. The data store includes one or more user profiles 160, one or more user activity logs 170, and a profile entity to activity mapping repository 180.

The DAPM 110 automatically monitors user activities, logs the monitored user activities in the user activity logs 170, and updates the user profiles 160 based on the user activities and the profile entity to activity mappings stored in the profile entity to activity mapping repository 180.

In certain embodiments, a user profile 160 contains a set of profile entities. A profile entity describes one aspect of a user, such as a role, skill/expertise, project, interest, etc. A taxonomy may be defined for each profile entity.

A profile entity to activity mapping repository 180 includes one or more profile entity to activity mappings that provide a set of activities that may be used to update profile entities in a user profile. For example, if a user is a software developer, then the user needs to do a certain amount of software development (where software development refers to a collection of programming activities). As another example, if the user is a programmer, then the user should spend a certain amount of time writing code before indicating in the user's profile that the user is a programmer.

In certain embodiments, the profile entity to activity mapping is an entity-to-collection map in which the entity stores profile information, and the collection stores the related activities. In various embodiments, the profile entity to activity mapping is not static and is updated by a user and/or administrator.

The user activity log 170 logs a user's daily activities. This user activity log 170 is then analyzed to identify possible updates to the user profile 160 (e.g., to extract the type of work the user has done). In certain embodiments, the user activity log 170 is analyzed for a period of time (e.g., a range of dates). In embodiments, the activity log 170 does not strictly refer to a log file; instead, any data that may be collected and used to reflect a user's activity may be viewed as part of a user activity log 170 (e.g., a blog, forum posts, etc.). Various activity logging tools may be used to collect activities for the user's activity log.

In embodiments, the user activity log 170 may be expanded with new activities and new ways of logging user activity being identified and implemented. In embodiments, the profile entity to activity mapping repository 180 may be expanded and improved with new profile entity to activity mappings being added.

Figure 2A:
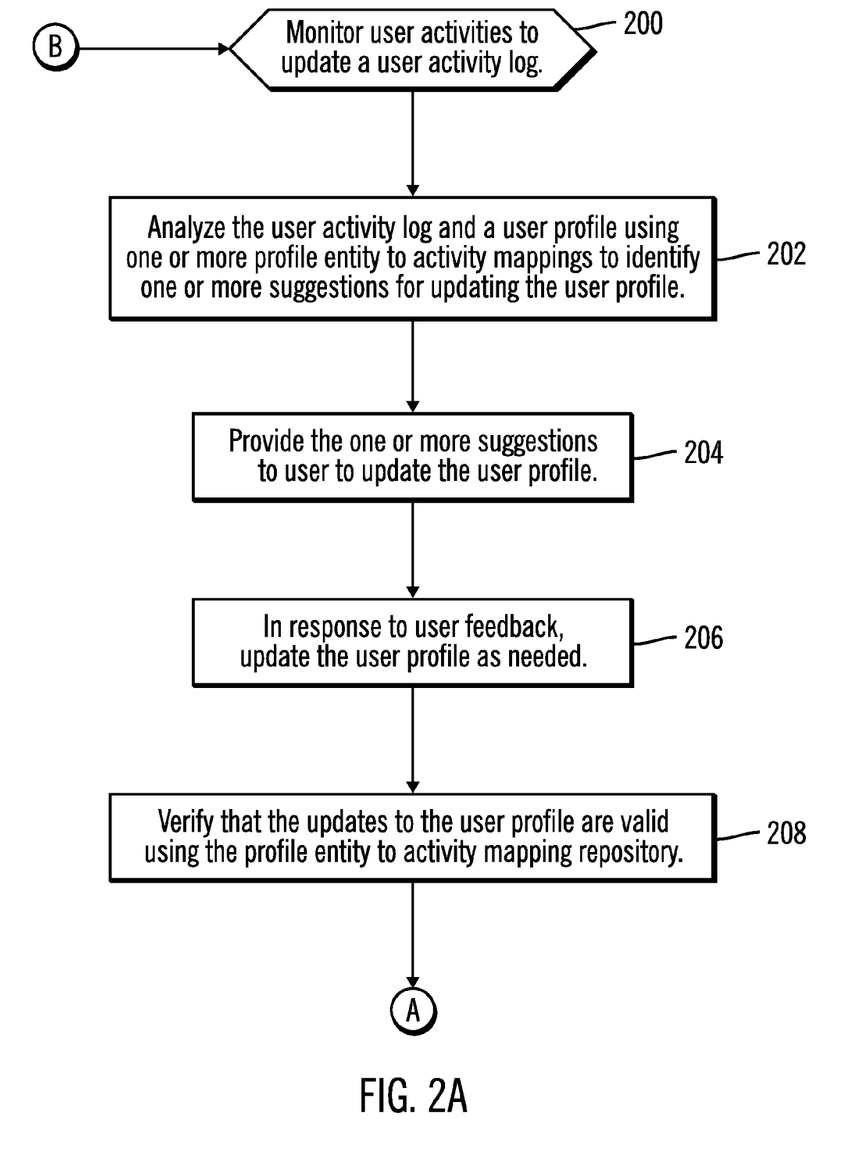
FIGS. 2A and 2B illustrate, in a flow diagram, operations performed by a Dynamic Activity Profile Manager (DAPM) in accordance with certain embodiments.
Figure 2B:
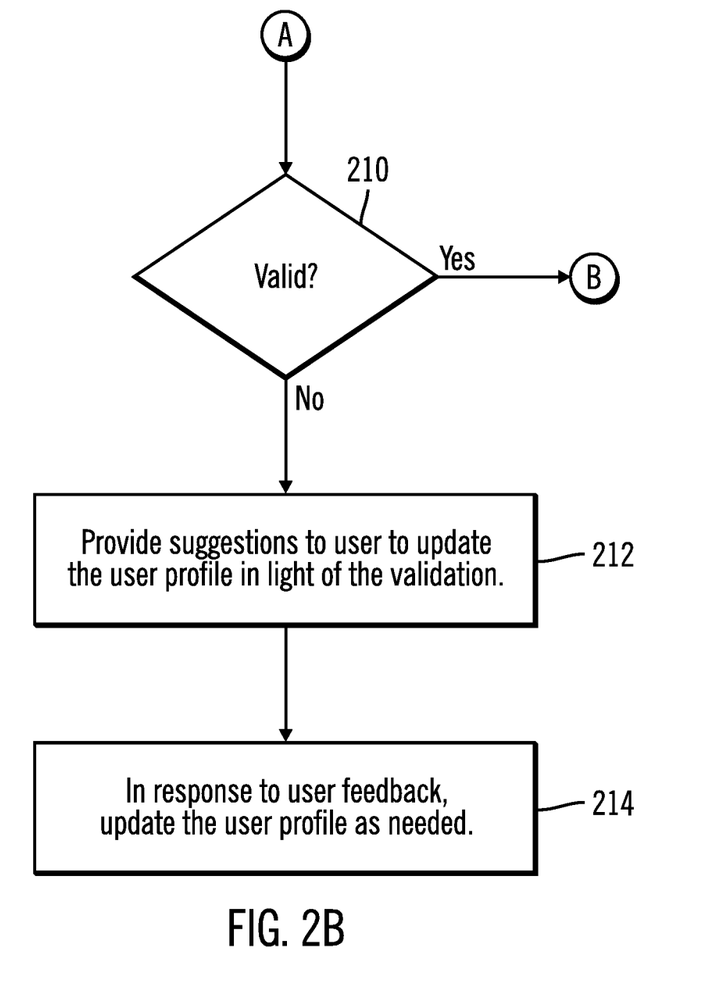

FIGS. 2A and 2B illustrate, in a flow diagram, operations performed by the DAPM 110 in accordance with certain embodiments. FIGS. 2A and 2B may be said to form "FIG. 2". Control begins at block 200 with the DAPM 110 monitoring user activities to create a user activity log. In certain embodiments, the DAPM 110 monitors and collects user activities such as, social network connections, development activity (e.g., software development tool, Rapid Application Development (RAD) tool, collaborative software development tool with source control and task tracking, etc.), collaboration (instant messaging, email, etc.), documents (e.g., slides, spreadsheets, etc.), meetings (e.g., calendars, calls, etc.), etc.

In block 202, the DAPM 110 analyzes the user activity log and the user profile using one or more profile entity to activity mappings (stored in the profile entity to activity mapping repository) to identify one or more suggestions for updating the user profile. In block 204, the DAPM 110 provides the one or more suggestions to the user to update the user profile. The user may be the user whose user profile is being updated or another user (e.g., a human resources manager, administrator, etc.). In block 206, the DAPM 110, in response to user feedback, updates the user profile as needed. In certain embodiments, the user feedback indicates acceptance of one or more suggestions and/or rejection of one or more suggestions. In certain embodiments, the user feedback indicates that there are no changes to the user profile. In certain embodiments, in addition to the suggested changes, the user may initiate additional changes to the user profile. In block 208, optionally, the DAPM 110 verifies that the updates to the user profile are valid using the profile entity to activity mapping repository. For example, this may be useful to verify that any additional changes initiated by the user are valid. From block 208 (FIG. 2A), processing continues to block 210 (FIG. 2B).

In block 210, the DAPM 110 determines whether the verification finds that the updated user profile is valid. If so, processing loops back to block 200, otherwise, processing continues to block 212. In block 212, the DAPM 110 provides suggestions to the user to update the user profile in light of the validation. The user may be the same user who received suggestions in block 204 or a different user. In block 214, the DAPM 110, in response to user feedback, updates the user profile as needed. In certain embodiments, there may be no changes to the user profile.

In certain embodiments, user profile verification may be conducted periodically. If a mismatch is found, then the user is notified together with suggestions and information about the mismatch. The user can then approve the suggested updates or reject them, and the user profile is updated based on this user feedback. The user can also make suggestions to improve the profile entity to activity mapping repository.

To differentiate among profile entities, different techniques (e.g., different font size or color) may be used to indicate how recent updates are or proficiency of certain profile entities.

Figure 3:
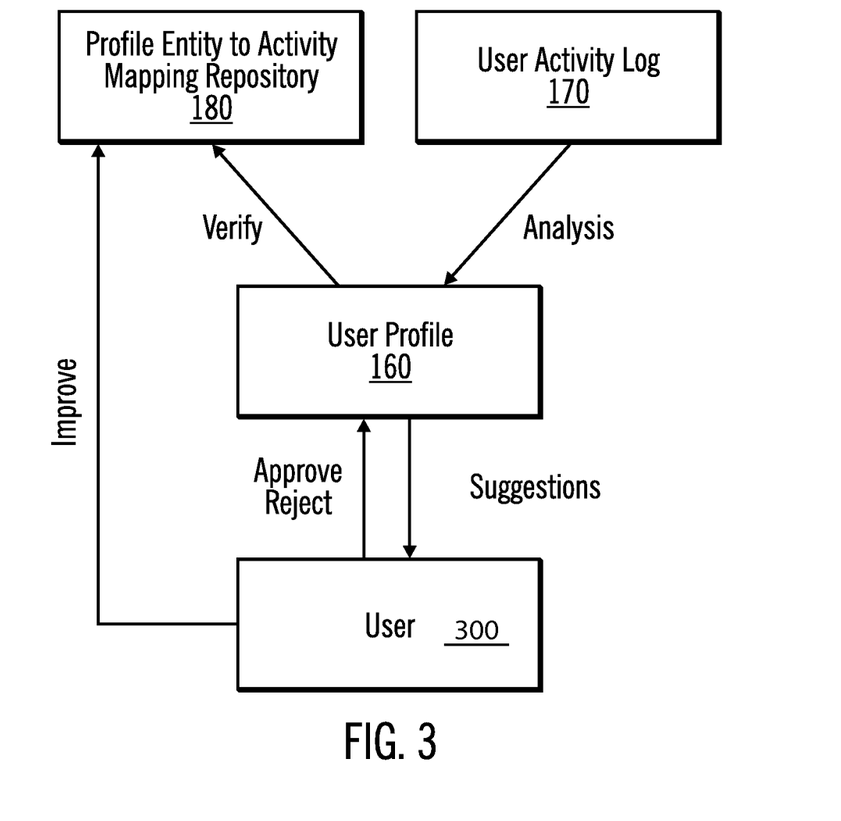
FIG. 3 illustrates, in a block diagram, a flow of processing in accordance with certain embodiments.

FIG. 3 illustrates, in a block diagram, a flow of processing in accordance with certain embodiments. The user activity log 170 is analyzed. Suggestions for adding to, deleting from, and otherwise updating the user profile 160 are sent to the user 300. The user 300 may approve/reject each of the suggestions (or all as a group). The user 300 may also improve the profile entity to activity mapping repository 180 for better verification of changes to the user profile.

With embodiments, a profile entity to activity mapping may be described as a profile schema, and for each of the elements in the schema, criteria for qualification (e.g. 40 hours/month qualifies particular language skill) is defined.

In certain embodiments, when existing user profile data does not match the results of the analysis, a notification is sent to the user for updating the user profile with a draft of edits and changes. In certain embodiments, each suggested profile change indicates the data source with a potential of access control enforced when viewed by others.

In certain embodiments, the DAPM 110 monitors enterprise users' activity and updates or recommends updating of user profile data based on analysis of the user's activities. Based on user activity analysis, if a mismatch is found against the user's profile, an update notice is sent to the user for approval. On approval, the user's profile is updated.

Merely to enhance understanding, examples will be provided. In a first example, a user switches job roles from development to technical sales, but does not update a user profile to reflect the new skill/role. The DAPM 110 generates a user activity log based on the user's use (and lack of use) of applications. In this example, this activity may be metered both by monitoring the user in server applications (e.g., the user's identifier (ID) is added to opportunities in the Customer Relationship Management system, but is no longer assigned defects/work items in the Defect Tracking/Source Control system) and by monitoring application use on the user's system (e.g., the user is no longer using their ID for developing source code, but is frequently using sales-related applications).

Continuing with this first example, the generated user activity log+the existing user profile are analyzed and checked against the profile entity to activity mapping repository. This is where activities are converted from the usage/nature of work in applications to actually profile entities describing the user's skills. Since the user is no longer developing source code, the DAPM 110 recommends removing a "Software Engineer" role, and specific skill "Programmer", and add a "Technical Sales" role and specific skills related to the product the user is selling. These suggestions are presented to the user (e.g., the suggestions may be emailed, presented with changes when the user views the profile, etc.) to approve or reject. If approved, the user profile is updated (e.g., in a profile database).

In a second example, a user begins developing using a new development tool that has not been used before in the company, but does not update the user profile to reflect this usage. The new development tool is new to the organization and considered a valuable new skill. In this second example, an administrator adds a new profile entity to activity mapping to the profile entity to activity mapping repository to map usage of the new development tool to a profile entity representing skill with the development tool.

Continuing with this second example, the user's consistent use of the new development tool, as well as the committing of new tool artifacts into source control is captured in the user activity log. When analyzed, the usage is mapped in the profile entity to activity mapping repository to a skill with the new development tool. The user is presented with the suggestion that the skill be added to the user profile, and, after the user accepts the suggestion, the user profile is updated.

In certain embodiments, the user profile is automatically updated and provides useful information for social networking and for effective communication/collaboration within a business organization.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
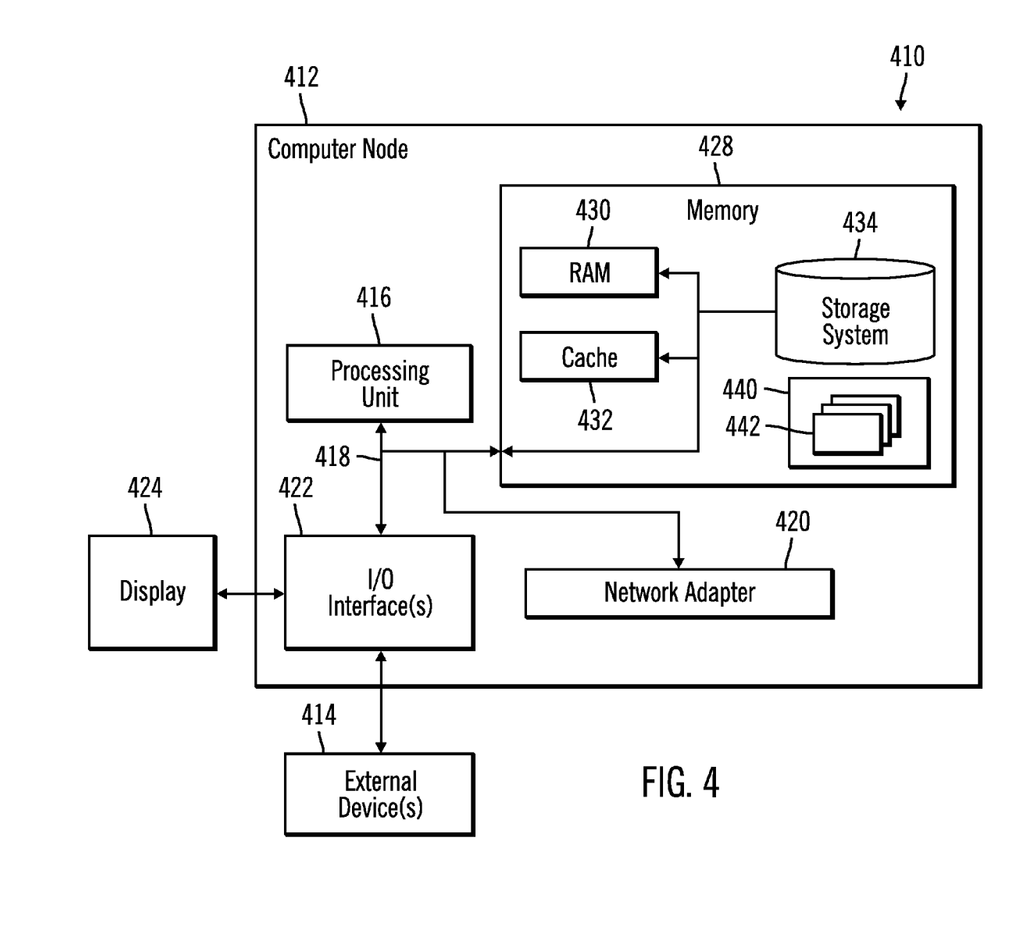
FIG. 4 illustrates a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to a processor or processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
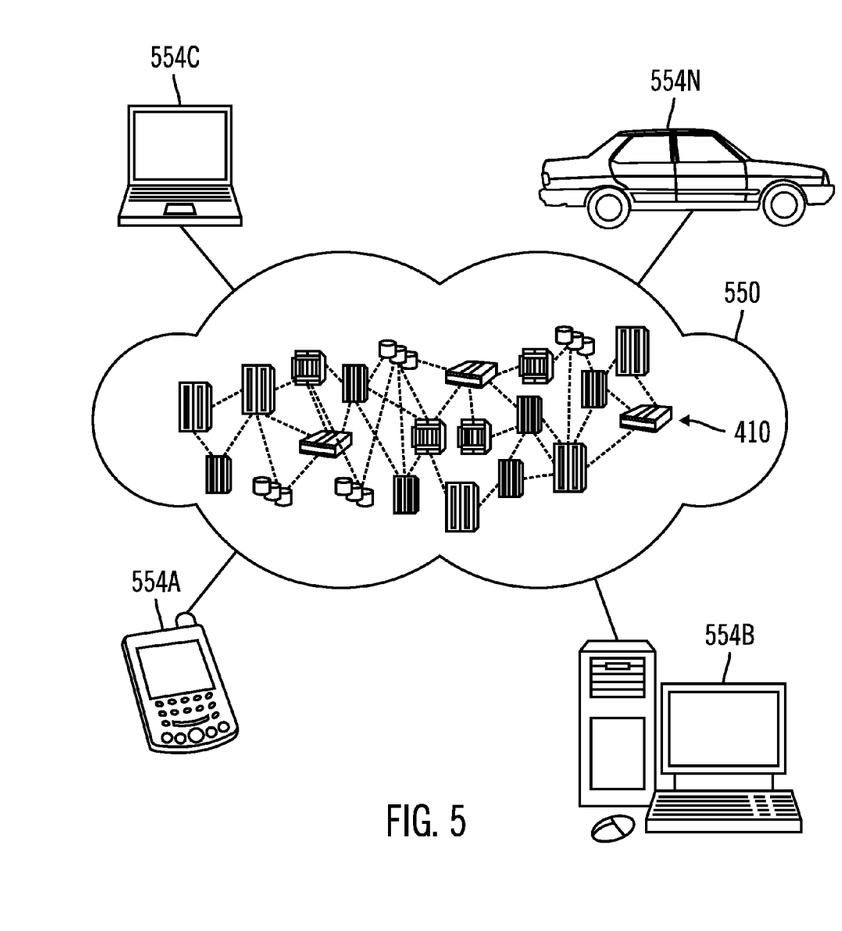
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
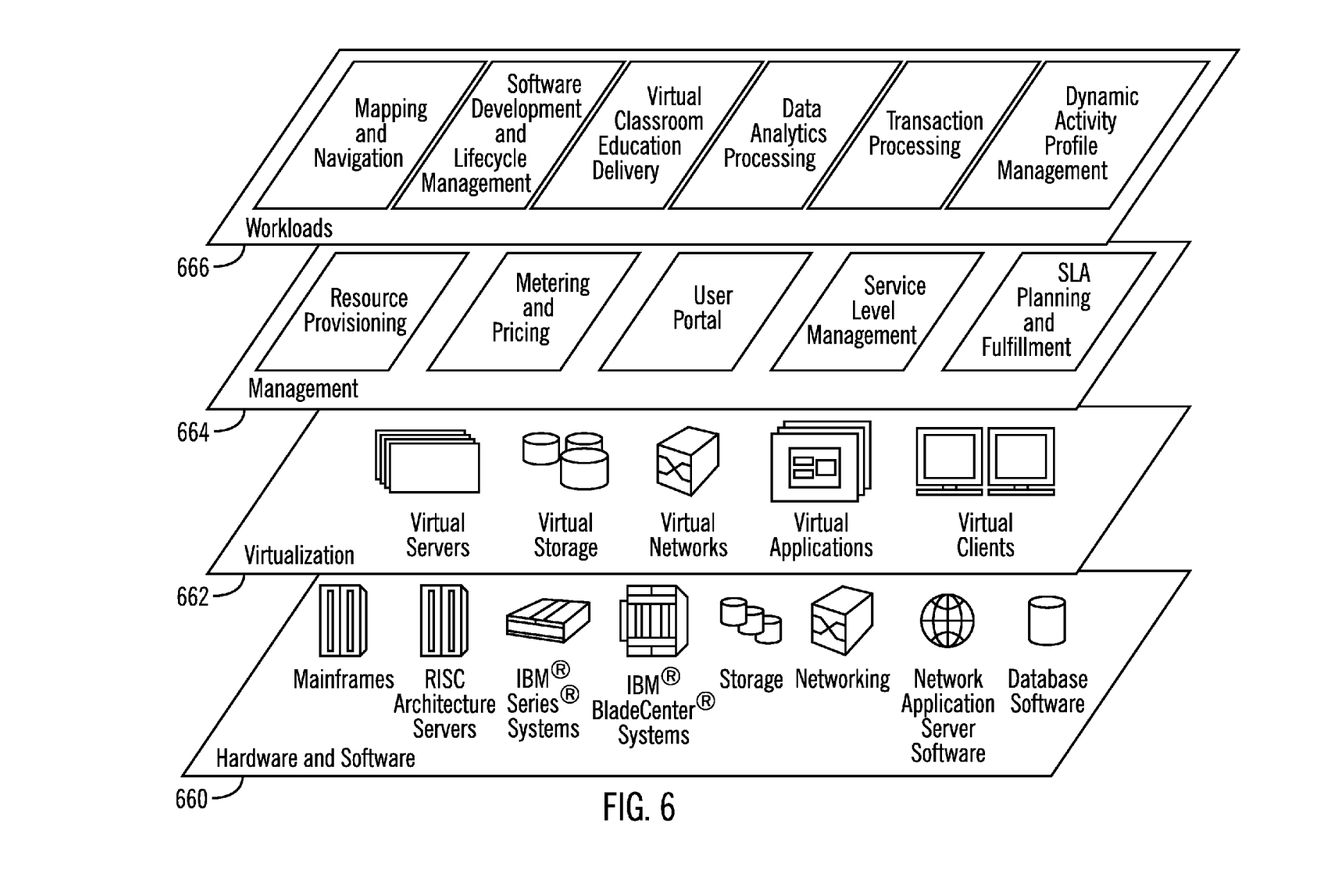
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dynamic activity profile management.

In certain embodiments, software or a program, implementing dynamic activity profile management in accordance with embodiments described herein, is provided as a service in a cloud environment.

In certain embodiments, the computing device 100 has the architecture of computing node 410. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer-implemented method, comprising:
periodically determining, using a processor of a computer, whether there is a mismatch of at least one of a skill and a role in a user profile by:
providing one or more profile entity to activity mappings that each provides an activity and a criteria for qualification that specifies an amount of time that the activity is performed for the qualification;
monitoring user activities to create a user activity log, wherein the monitoring includes monitoring the user activities of social network connections, software development work, collaboration work, document work, and meetings;
analyzing the user activity log and the user profile using the one or more profile entity to activity mappings to identify one or more suggestions for updating the user profile when the activity is performed for the amount of time;

providing the one or more suggestions to update the user profile;

in response to acceptance of a suggestion of the one or more suggestions, updating the user profile by adding the suggestion as an update in one of a different color and a different size to indicate how recent the update is and in another of the different color and the different size to indicate proficiency;

receiving an additional update to the user profile in response to user input;

in response to determining that the additional update is valid using the one or more profile entity to activity mappings, continuing the monitoring of the user activities; and in response to determining that the additional update is not valid using the one or more profile entity to activity mappings, providing at least one new suggestion in light of the determination that the additional update is not valid; and in response to acceptance of the at least one new suggestion, updating the user profile.

2. The method of claim 1, further comprising:

receiving a new profile entity to activity mapping; and storing the new profile entity to activity mapping in a profile entity to activity mapping repository.

3. The method of claim 1, wherein a profile entity describes an aspect of a user.

4. The method of claim 1, further comprising:

defining a profile schema having an element for the user profile; and for the element in the profile schema, defining criteria for qualification of the element for use in updating the user profile.

5. The method of claim 1, wherein a Software as a Service (SaaS) is provided to perform method operations.

* * * * *